US010672057B2

(12) United States Patent
Bogle et al.

(10) Patent No.: US 10,672,057 B2
(45) Date of Patent: *Jun. 2, 2020

(54) SYSTEM AND METHOD FOR PREDICTING AND PRESENTING A CROSS-SELL PRODUCT

(71) Applicant: STATE FARM MUTUAL AUTOMOBILE INSURANCE COMPANY, Bloomington, IL (US)

(72) Inventors: Jerry R. Bogle, Bloomington, IL (US); Scott E. Taubert, Bloomington, IL (US); Margaret A. Sennett, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/262,304

(22) Filed: Jan. 30, 2019

(65) Prior Publication Data

US 2019/0164215 A1   May 30, 2019

Related U.S. Application Data

(63) Continuation of application No. 13/766,503, filed on Feb. 13, 2013, now Pat. No. 10,229,447.

(51) Int. Cl.
*G06Q 30/02* (2012.01)
*G06Q 30/06* (2012.01)

(52) U.S. Cl.
CPC ........ *G06Q 30/0631* (2013.01); *G06Q 30/02* (2013.01)

(58) Field of Classification Search
CPC ..................................... G06Q 30/02
USPC ........................................... 705/4
See application file for complete search history.

(56) References Cited

U.S. PATENT DOCUMENTS

| 7,801,750 | B1 † | 9/2010 | Wallach |
| 7,949,556 | B1 † | 5/2011 | Wallach |
| 2001/0037281 | A1 | 11/2001 | French et al. |
| 2004/0128172 | A1 | 7/2004 | Van Cleave et al. |
| 2004/0249712 | A1* | 12/2004 | Brown ............ G06Q 30/02 705/14.19 |

(Continued)

*Primary Examiner* — Robert R Niquette
*Assistant Examiner* — Liz P Nguyen
(74) *Attorney, Agent, or Firm* — Marshall, Gerstein & Borun LLP

(57) ABSTRACT

A method for facilitating a price quote for a cross-sell product includes receiving an input indicating that a first price quote application associated with a first insurance product has been completed and, after receiving the input, directing a customer to a cross-sell bundle web page. The web page indicates a price quote for the first insurance product, and a message prompting the customer to begin a second price quote application associated with a second insurance product. The method also includes causing, using information obtained from the customer via the first price quote application, one or more information fields of the second price quote application to be populated, and calculating, based at least on information in the populated fields, a price quote for the second insurance product. The method also includes causing a the price quote for the second insurance product to be displayed to the customer.

20 Claims, 10 Drawing Sheets

(56) References Cited

U.S. PATENT DOCUMENTS

| | | |
|---|---|---|
| 2006/0136323 A1 | 6/2006 | Barry et al. |
| 2009/0216591 A1 | 8/2009 | Buerger et al. |
| 2011/0301983 A1* | 12/2011 | Guida .................... G06Q 40/00 705/4 |
| 2012/0239515 A1 | 9/2012 | Batra et al. |
| 2012/0284058 A1 | 11/2012 | Varanasi et al. |
| 2013/0013344 A1 | 1/2013 | Ernstberger et al. |
| 2013/0144658 A1 | 6/2013 | Schnabolk et al. |
| 2013/0204645 A1 | 8/2013 | Lehman et al. |

\* cited by examiner
† cited by third party

Discount Details — 320

| Products | With Multi-line Discounts | Without Multi-line Discounts | Savings |
|---|---|---|---|
| Auto Insurance | $68.24/mo | $87.54/mo | $19.29/mo |
| Renters Insurance | $12.14/mo | $15.38/mo | $3.24/mo |
| Total | $80.39/mo | $102.92/mo | $22.53/mo |

You May Also Be Interested In

Vehicle Loan —— 316

314

Vehicle Info
2012 Ford Escape Sport

Loan:
2.1% APR
36-month loan

318
$398.34/mo

Your Bundle —— 308

Auto (Quote complete)

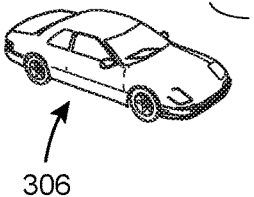

306

310
Vehicle 1
2012 Chevrolet Impala

Coverage
Bod. Injury: $20k/$40k
Prop. Damage: $50k
Deduct: $500/$1,000

Vehicle 1
2012 Chevrolet Silverado 4x4

Coverage
Bod. Injury: $20k/$40k
Prop. Damage: $100k
Deduct: None

312
C$68.25/mo

Renters (Quote not complete)

306

310
Address
1234 Peppercorn Trail
Apt 2
Bloomington, IL 6001

Coverage
Contents: $25k
Pers. Liability: $100k
Deduct: $500

C$12.14/mo

Other Products Available

322

| Life | Condo | Motorcycle |
|---|---|---|
| Life Insuranse | Condo Insuranse | Motorcycle Insuranse |
| 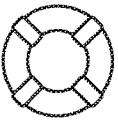 |  | |
| Add to bundle | Add to bundle | Add to bundle |

FIG. 3

First Product Application

Please add up to 4 private passenger vehicles you'd like to quote. If you need to quote more than 4 private passenger vehicle, please work with an Agent.

Vehicles Found Based On Your Address (?)

☑ 2009 HONDA ACCORD - "EX-L" 2D CPE GAS       FOUND

| | |
|---|---|
| Was this vehicle purchased in the past 6 months? (?) | ○ Yes ○ No |
| How is this vehicle financed? | ○ Loan ○ Lease ○ Own |
| What is this vehicle primary use? (?) | [To/from work/school ▼] |
| How many miles is this vehicle driven to work or school? (?) | [ ] miles one way |
| How many days a week is this vehicle driven to work or school? | [5 ▼] |
| How many miles do you expect to put on this vehicle in the next 12 months? (?) | [ ] miles |
| Does this vehicle have a permanently installed anti-theft device? | ○ Yes ○ No |
| Would you like to enroll this vehicle in the Drive Safe & Save™ program? | ○ Yes ○ No |

502 points to the left column of questions; 504 points to the right column of answers.

☑ 2001 HONDA ODYSSEY - "EX" SPORT VAN GAS       FOUND

| | |
|---|---|
| Was this vehicle purchased in the past 6 months? (?) | ○ Yes ○ No |
| How is this vehicle financed? | ○ Loan ○ Lease ○ Own |
| What is this vehicle primary use? (?) | [To/from work/school ▼] |
| How many miles is this vehicle driven to work or school? (?) | [ ] miles one way |
| How many days a week is this vehicle driven to work or school? | [5 ▼] |
| How many miles do you expect to put on this vehicle in the next 12 months? (?) | [ ] miles |
| Is this vehicle a customized van? | ○ Yes ○ No |

FIG. 5

SYSTEM AND METHOD FOR PREDICTING AND PRESENTING A CROSS-SELL PRODUCT

CROSS-REFERENCE TO RELATED APPLICATIONS

The present application is a continuation of U.S. patent application Ser. No. 13/766,503, entitled "System and Method For Predicting And Presenting A Cross-Sell Product" and filed on Feb. 13, 2013, the entire disclosure of which is hereby incorporated by reference herein.

TECHNICAL FIELD

The present disclosure generally relates to a system and method for predicting a potential product to sell to a customer and presenting the product to the customer at an opportune time to persuade the customer to purchase the product.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many companies use online web stores to sell products which must be price quoted, purchased, and/or updated based on customer specific information. Though this can be accomplished when a customer wishes to quote and/or purchase a single product, it becomes difficult and frustrating when a customer wishes to buy numerous products, because customers have to complete individual and separate transactions and/or repeatedly enter the same information for each product. Accordingly, websites selling these products currently offer limited online functionality for the customer and do not proactively and intelligently engage online customers to purchase products based on their needs. Instead, providers rely heavily on sales associates (agents, staff, call centers, etc.) to follow through with customers to promote and sell additional opportunities, services, and products.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A company website using a centralized service with a next best message prediction and presentation system can present a next best message, such as a cross-sell message, to an online customer perusing the company site that can help the customer meet their purchasing needs by directing the customer through an online purchase quoting and purchasing session. Such a system can facilitate customer interaction with the company website and can enable customers to complete multiple tasks in a single transaction. The end to end processing of this online experience can be managed through a central cross-sell bundle page. The customer will have the ability to select one or more products to price quote and/or purchase, see the total discounts provided by purchasing groups of specific products, and respond to one or more next best messages predicted and presented by the next best message prediction and presentation system.

In one aspect, a method, implemented in a server, for facilitating a price quote for a cross-sell product may include (1) receiving, by one or more processors of the server, an input indicating that a first price quote application associated with a first insurance product has been completed; (2) after receiving the input, directing, by the one or more processors, a customer to a cross-sell bundle web page indicating (a) a price quote for the first insurance product and (b) a first message prompting the customer to begin a second price quote application associated with a second insurance product; (3) causing, by the one or more processors and using information obtained from the customer via the first price quote application, one or more information fields of the second price quote application to be populated; (4) calculating, by the one or more processors and based at least on information in the populated one or more information fields pertaining to the second insurance product, a price quote for the second insurance product; and/or (5) causing, by the one or more processors, a the price quote for the second insurance product to be displayed to the customer.

In another aspect, a computer device for predicting a cross-sell product to be presented to a customer includes one or more processors and one or more memories coupled to the one or more processors. The one or more memories store instructions that, when executed by the one or more processors, cause the one or more processors to: (1) receive an input indicating that a first price quote application associated with a first insurance product has been completed; (2) after receiving the input, direct the customer to a cross-sell bundle web page indicating (a) a price quote for the first insurance product and (b) a first message prompting the customer to begin a second price quote application associated with a second insurance product; (3) cause, using information obtained from the customer via the first price quote application, one or more information fields of the second price quote application to be populated; (4) calculate, based at least on information in the populated one or more information fields pertaining to the second insurance product, a price quote for the second insurance product; and/or (5) cause a the price quote for the second insurance product to be displayed to the customer.

In another aspect, a non-transitory computer readable medium stores instructions that, when executed by one or more processors, cause the one or more processors to: (1) receive an input indicating that a first price quote application associated with a first insurance product has been completed; (2) after receiving the input, direct a customer to a cross-sell bundle web page indicating (a) a price quote for the first insurance product and (b) a first message prompting the customer to begin a second price quote application associated with a second insurance product; (3) cause, using information obtained from the customer via the first price quote application, one or more information fields of the second price quote application to be populated; (4) calculate, based at least on information in the populated one or more information fields pertaining to the second insurance product, a price quote for the second insurance product; and/or (5) cause a the price quote for the second insurance product to be displayed to the customer.

The features and advantages described in this summary and the following detailed description are not all-inclusive. Many additional features and advantages will be apparent to

BRIEF DESCRIPTION OF THE DRAWINGS

FIG. 3 is an exemplary layout of a cross-sell bundle page;

FIG. 5 is an exemplary layout of a cross-sell bundle page;

DETAILED DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term " " is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
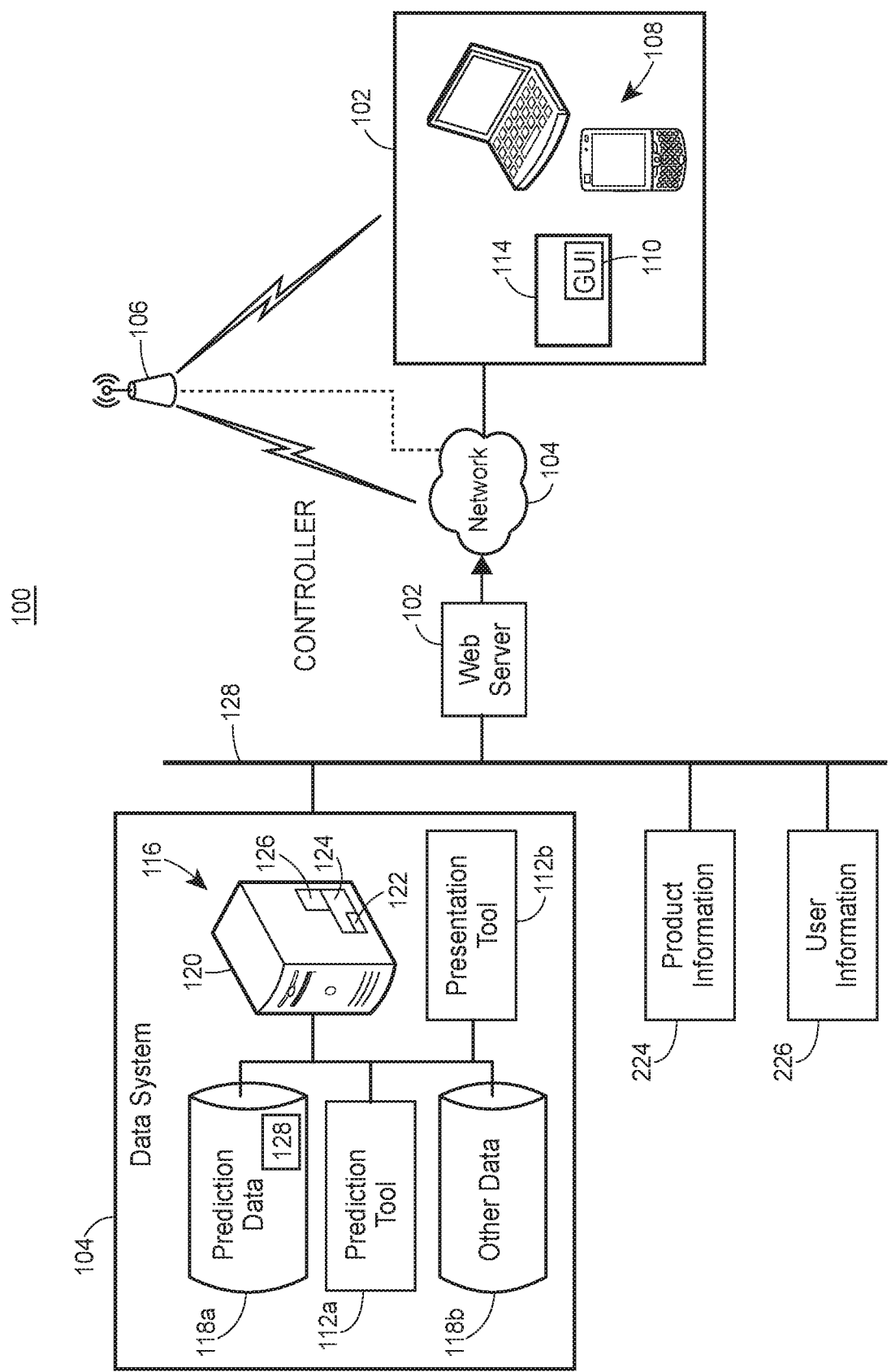
FIG. 1 is a simplified and exemplary block diagram of a system for predicting and presenting a cross-sell product.

FIG. 1 illustrates various aspects of an exemplary architecture 100 implementing a next best message prediction and presentation system. The high-level architecture includes both hardware and software applications, as well as various data communications channels for communicating data between the various hardware and software components. The next best message prediction and presentation system 100 may include various software and hardware components or modules that may employ a method to predict and present a next best message to a customer. The various modules may be implemented as computer-readable storage memories containing computer-readable instructions (i.e., software) for execution by a processor of the computer system 100. The modules may perform the various tasks associated with gathering information relating to consumers, presenting information to consumers about various products, predicting a next best message, such as a message presenting a potential cross-sell product, to present to a customer and presenting the next best message to the consumer, as herein described. The computer system 100 also includes both hardware and software applications, as well as various data communications channels for communicating data between the various hardware and software components. In an embodiment, customer information 124 may be retrieved from a customer answering one or more questions pertaining to the customer himself and/or one or more products. In alternate embodiment, customer information may be received from one or more third party databases or inputted by sales associates. The customer information storage 124 may be a part of a data server 122 or may be a separate server with independent memory.

The prediction and presentation system 100 may include a computing device 108 that is capable of executing a graphical interface (GUI) 110 for a prediction tool 112 and a presentation tool within a web browser 114. Those skilled in the art will recognize that the present system can be used in a dedicated application in addition to a web browser. In some embodiments, a computing device 108 executes instructions of a network-based data system 116 to receive prediction data 118a, presentation data and other data 118b at the front end components 102 via the computer network 106 for display in the GUI 110. The front end components 102 may receive the data 118a, 118b from the back end components 104 via the computer network 106 from execution of a prediction and presentation tool 112. The device 108 may include a personal computer, smart phone, tablet computer, or other suitable computing device. The GUI 110 may communicate with the system 116 through the Internet 106 or other type of suitable network (e.g., local area network (LAN), a metropolitan area network (MAN), a wide area network (WAN), a mobile, a wired or wireless network, a private network, a virtual private network, etc.). A system server 120 may send and receive information and data 118a, 118b, for the system 100 such as computer-executable instructions and data associated with applications executing on the computing device 108. The applications executing within the system 100 may include cloud-based applications, web-based interfaces to the data system 116, software applications executing on the computing device 108, or applications including instructions that are executed and/or stored within any component of the system 100. The applications, GUI 110, browser 114, and tool 112 may be stored in various locations including separate repositories and physical locations.

In some embodiments, the data system 116 in general and the server 120 in particular may include computer-executable instructions 122. The instructions 122 may instantiate a prediction tool 112 and a presentation tool 112 or send instructions to the computing device 108 to instantiate a GUI 110 for the tool 112 using a web browser application 114 of a computing device 108. In some embodiments, the browser application 114, GUI 110, a prediction tool 112 and a presentation tool 112, and elements of the data system 116 may be implemented at least partially on the server 120. The data system 116 and processor 126 may execute instructions 122 to display the GUI 110 including the data 118a, 118b within a display of the computing device 108. The GUI 110 may allow a customer to access various data 118a, 118b within the data system 116, edit or add data to the system 100, and other actions with the system data.

The web server 102 may be implemented in one of several known configurations via one or more servers configured to process web-based traffic received via the network 204 and may include load balancing, edge caching, proxy services, authentication services, etc.

The data server 122 may be connected to the web server 202 via a network 226 and may implement the processes described above for predicting, presenting and storing the next best message.

Figure 2:
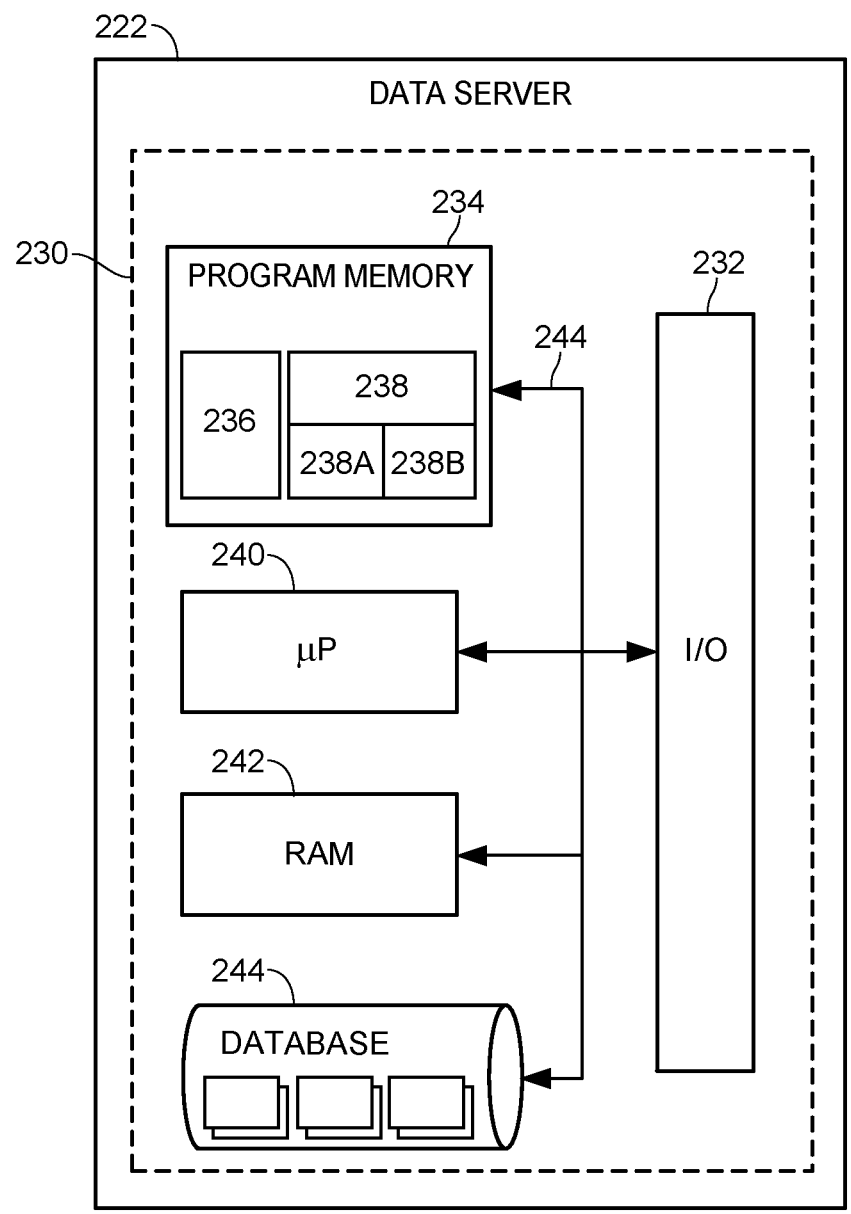
FIG. 2 is an exemplary architecture of server of a system for predicting and presenting a cross-sell product.

Referring now to FIG. 2, a data server 120 includes a controller 228. The controller 228 includes a program memory 232, a microcontroller or a microprocessor (μP) 238, a random-access memory (RAM) 240, and an input/output (I/O) circuit 230, all of which are interconnected via an address/data bus 244. The program memory 232 may store computer-executable instructions, which may be executed by the microprocessor 238. In some embodiments, the controller 228 may also include, or otherwise be communicatively connected to, a database 242 or other data storage mechanism (e.g., one or more hard disk drives, optical storage drives, solid state storage devices, etc.). The database 242 may include data such as customer questionnaires, if not implemented in the web server 202, etc. The database 242 may also include customer/consumer profile information for use in predicting, presenting and storing potential next best messages to present to the customer. It should be appreciated that although FIG. 1 depicts only one microprocessor 238, the controller 228 may include multiple microprocessors 238. Similarly, the memory 232 of the controller 228 may include multiple RAMs 234 and multiple program memories 236, 236A and 236B storing one or more corresponding server application modules, according to the controller's particular configuration. The data server 222 may also include specific routines to render the data into an image for display by a client computer (not depicted) or any of the web devices 210 via web server 202.

Although FIG. 2 depicts the I/O circuit 230 as a single block, the I/O circuit 230 may include a number of different types of I/O circuits (not depicted), including but not limited to, additional load balancing equipment, firewalls, etc. The RAM(s) 234, 240 and the program memories 236, 236A and 236B may be implemented in a known form of computer storage media, including but not limited to, semiconductor memories, magnetically readable memories, and/or optically readable memories, for example, but does not include transitory media such as carrier waves.

With reference to FIG. 3, a user interface of a cross-sell bundle web page 300 may provide a customer a central location to manage a plurality of products 306 selected by the customer for purchase. One or more products 306 which have been selected by the customer for purchase may be referred to as a bundle 308. The price of each product 306, however, may vary depending on a plurality of customer-specific information 310, such as a vehicle name or an address. Accordingly, the product 306 may require a customer specific price quote 312. A price quote 312 may be calculated by a suitable back end system, such as the data server 120 of FIG. 1. For example, in order to calculate a price quote 312 for automobile insurance, the data server may require customer-specific information 310 regarding the model of the car. Other customer-specific information 310 may include, but is not limited to the value of the car, the mileage of the car, any prior accidents, as well as information about the residence of the primary customer of the car (not shown).

The cross-sell bundle page 300 may also display one or more potential cross-sell messages 314 for one or more cross-sell products 316 available for purchase from the company. The cross-sell message 314 may also contain a preliminary price quote 318. The cross-sell 300 bundle page may also display a status message 318 for each product representing the customers progress in completing an application to determine the price quote 312 for the product 306. If customer-specific information 310 about the customer in regards to one or more of the products 306 is already known, the customer-specific information 310 may also be displayed on the cross-sell bundle page 300. If one or more product price quotes 312 have been completed, the product price quote 312 may also be displayed on the cross-sell bundle page 300. Furthermore, depending on the products 306 which have been selected by the customer for purchase, one or more discounts 320 may apply to one or more products 306 in the bundle 308. Accordingly, any discounts 320 for which the products 306 are eligible are displayed on the cross-sell bundle page 300 and may be represented by a numerical amount in one or more currencies and/or a percentage. The cross-sell bundle page may also display one or more company products 322 offered for sale by the company but not in the bundle. Upon reviewing the cross-sell bundle page 300, the customer may make an input indicating a price quote application to be started. In response to the selection, the customer may be directed to a first product question page.

Figure 4:
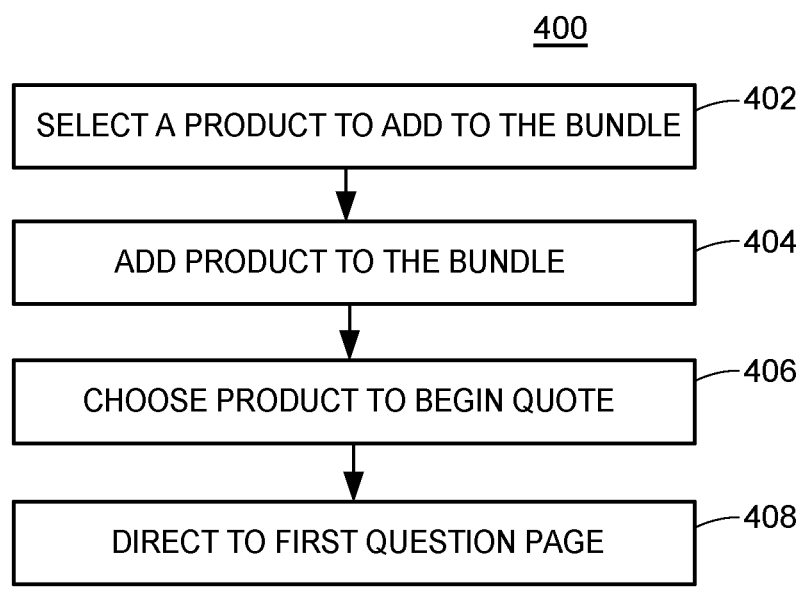
FIG. 4 is a flow chart illustrating a method for starting a price quote application according to one embodiment of the present invention.

With reference to FIG. 4, the system 100 described herein may be employed in a method 400 (FIG. 4) to begin a price quote application. If a customer desires to purchase one or more products, the customer may first need to receive one or more price quotes for the one or more products the customer wishes to purchase. Accordingly, the customer may select a product to add to their bundle (block 402). The customer may enter an input, via a mouse click, touch press, etc., representing the product to be selected. In response to a customer input representing the selection of a first product to be added to the bundle, the product may then be added to the bundle (block 404). Once the customer has one or more products in their bundle, the customer may select a product in the product bundle to receive a price quote (block 406). In response to a customer input representing the selection of a first product to be price quoted, a first price quote application is begun (block 408) and the user is directed to a first question page, where the data server may generate and display one or more questions used to receive information from the customer regarding the desired product. In alternate embodiments, the customer may directly begin the price quote application without first entering the product into their bundle.

For example, in FIG. 5, a first product question page 500 is shown with a plurality of questions 502 relating to the first product price quote application, for example, an automobile insurance price quote application. In one embodiment the first product question page 500 may be a separate webpage. In an alternate embodiment, the plurality of questions 502 may load on the page the customer is currently viewing, or be displayed in a pop up window. In yet another embodiment, the first product question page 500 may be displayed by a discreet application, such as a web application, mobile device application or computing device application. The answers 504 to the plurality of questions 502 may provide a data server, such as the data server 120 of FIG. 1, information useful in calculating the price quote for the product (such as the customer specific price quote 312 and product 306 of FIG. 3). The plurality of questions 502 may be objective, such as yes or no, may be subjective and require the customer to input an answer and/or may have a predefined set of answers. The customer may answer the questions using a variety of input methods, such as check boxes, drop down menus and text boxes and may be inputted using a variety of input devices such as a keyboard, mouse, finger press, stylus input, etc.

Figure 6:
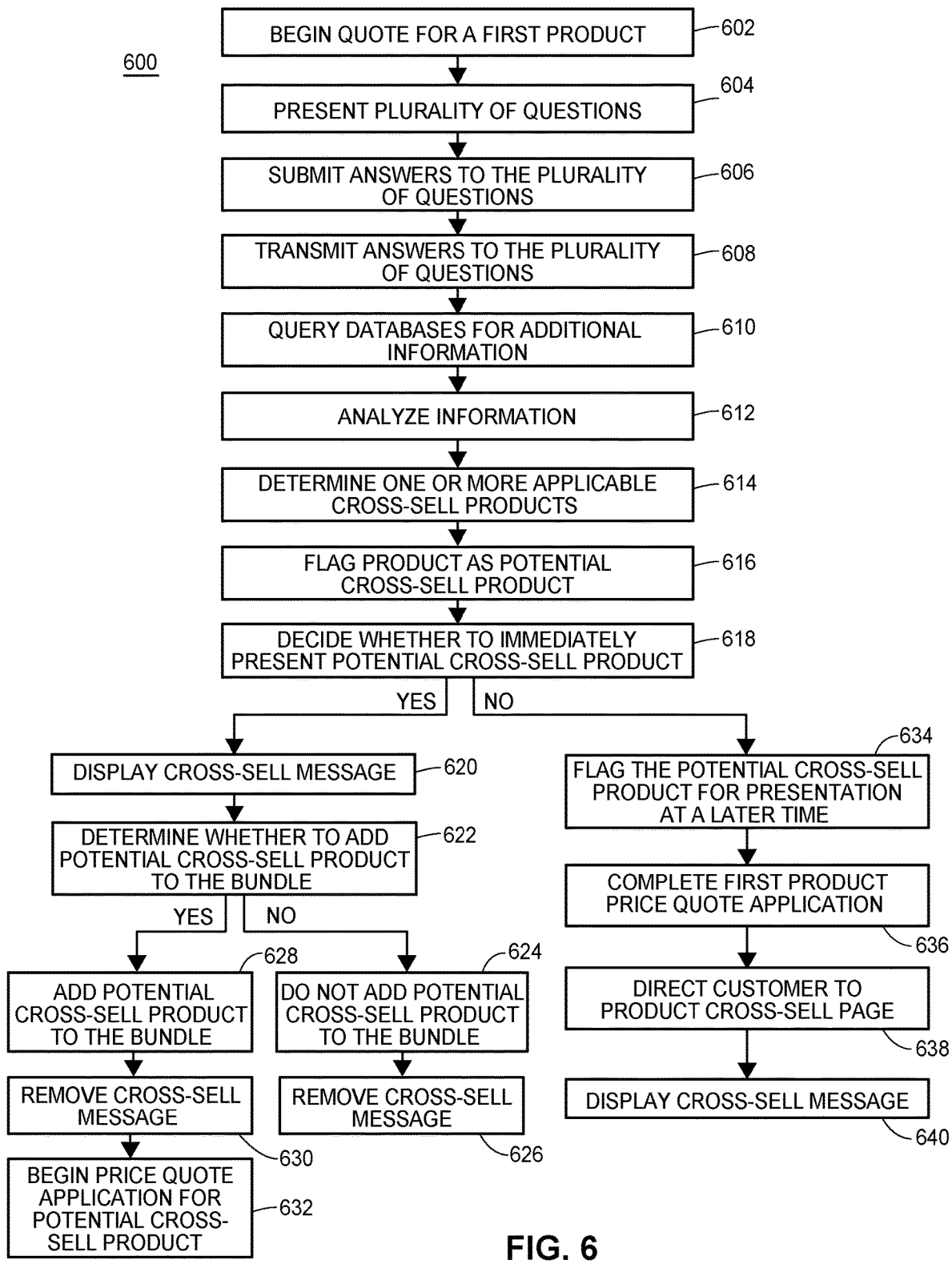
FIG. 6 is a flow chart illustrating an exemplary method for predicting and presenting an cross-sell product according to one embodiment of the present invention.

FIG. 6 is a flowchart of a method, routine or process 600 for prediction and presentation of a cross-sell product for a customer. The method 600 may be performed on one or more computers, such as the data server illustrated in FIG. 1. A customer on a company web page or using a dedicated application for purchasing products or services from the company may make a selection indicative of a decision to receive a quote for a particular first product (block 602). Exemplary products may include auto insurance, renter insurance, condo insurance, home insurance, vehicle loans, motorcycle insurance, life insurance, etc. In response to the customer's selection, a first product quote application begins and the customer is presented with a plurality of questions (block 604). The questions may relate to information about the first product used by the data server in calculating a quote for the first product. Exemplary questions may include a customer's age, address, square footage of a living area, make and model of a car, etc. When the customer has answered one or more of the questions they may press a proceed button or make some other input indicating they are ready to proceed. The data server then receives the input indicating that the customer is ready to submit the answers to the questions (block 606). The system will receive the input indicating that the customer is ready to submit the answers and upon receiving the input, the customer's answers are transmitted to the data server (block 608).

Once the data server has received the information which the customer has entered, the data server may also query one or more third party databases in order to gather additional information about the customer in regards to the one or more potential cross-sell products (block 610). The data server may then use the information gathered from the customer and the $3^{rd}$ party DB to determine if any of the information is indicative of one or more other products or services offered by the company, but not selected by the customer, to add to their bundle (block 612). The data server may determine, for example, that based on the information gathered, one or more products offered for sale by the company, but not selected by the customer, may be relevant to the customer (block 614). For example, in reference FIG. 3, while answering the plurality of questions relating to an auto insurance quote, the data server may receive an input indicated that the customer leases a car and rents an apartment. In response, the data server may recognize that the company offers a renters insurance product and/or a car loan product. The data server may then flag the one or more products as potential cross-sell products for presentation to the customer for consideration (block 616).

The data server may also decide whether to present the information to the customer for immediate consideration (block 618). If the data server decides to immediately present the information to the customer for immediate consideration (YES block of 618), then the data server generates a display message to the customer promoting the cross-sell product (block 620). The message generated by the data server to promote the potential cross-sell product may also include one or more potential discounts for which the customer may be eligible for if the customer purchases the first product and the one or more cross-sell products.

The data server may then receive an input representing a customer selection to add the one or more cross-sell products to their bundle. After receiving the input representing the selection, the data server may receive an input indicating whether or not the customer wishes to add the product to their bundle (block 622). If the data server receives an indication that the customer does not wish to add the cross-sell product to their bundle (NO branch of block 622), the data server does not add the product to their bundle (block 624). The data server may then send a message to the web server to no longer display the cross-sell message, and the price quote for the first product is continued (block 626). If the data server receives an indication that the customer wishes to add the cross-sell product to their bundle (YES branch of block 622), the data server adds the product to their bundle (block 628). The data server may then send a message to the web server to no longer display the cross-sell message and the price quote for the first product is continued (block 630).

When the web server receives an input indicating that the customer has completed the price quote application for the first product, the web server may immediately direct the customer to a cross-sell price quote application page in order to begin the price quote application for the one or more cross-sell products (block 632). In an alternate embodiment, the web server may first direct the customer to the cross-sell bundle page and may direct the customer to a cross-sell price quote application upon receiving an input indicating a user input to begin the price quote application for the cross-sell product. In yet another alternate embodiment, the web server may receive an input indicating a customer's desire to immediately start the price quote application for the cross-sell product upon being presented with the message promoting the one or more cross-sell products.

However, immediately presenting a message to a customer in this manner may frustrate or confuse the customer, by drawing the customer's attention away from the first price quote application they are currently processing and turning their attention to a different product other than the one the customer is currently processing. Furthermore, by the time the customer has investigated the one or more cross-sell products, they may have forgotten about or lost interest in completing the first product price quote application. Accordingly, the data server may decide not to immediately present the cross-sell product to the user (YES branch of block 622) and the data server may store a value or other indication representing that the one or more products are potential cross-sell products for presentation to the customer at a later time (block 634). The data server may then determine whether to present a message to the customer promoting the cross-sell product at a later time. For example, once the web server has receives an input indicating that the customer has completed the price quote application for the first product (block 636), the web server may direct the customer to the cross-sell bundle page, where the data server may generate and display a message identifying the one or more products in the customer's bundle (block 638).

Upon completing the first price quote application, the web server may direct the customer to the cross-sell bundle page. Once the cross-sell bundle page has loaded, the data server may instruct the web server to present one or more messages providing information about the cross-sell product and suggesting that the customer add the cross-sell product to their bundle (block 640). If the data server has determined that there may be more than one potential cross-sell product, all of the potential cross-sell products may be displayed in the same message. Alternatively, the data server may generate and display multiple messages, wherein each message contains a subset of the cross-sell products.

Advantageously, the data server may be able to use the information to present a price quote to the customer as well as a potential discount to the customer if the data server receives an input indicating that the user has selected the cross-sell product to add to their bundle. In an alternate embodiment the data server may generate and display one or more messages promoting the potential cross-sell product at some other time or through some other messaging interface, such as via an e-mail communication, text message, phone call, etc.

Figure 7:
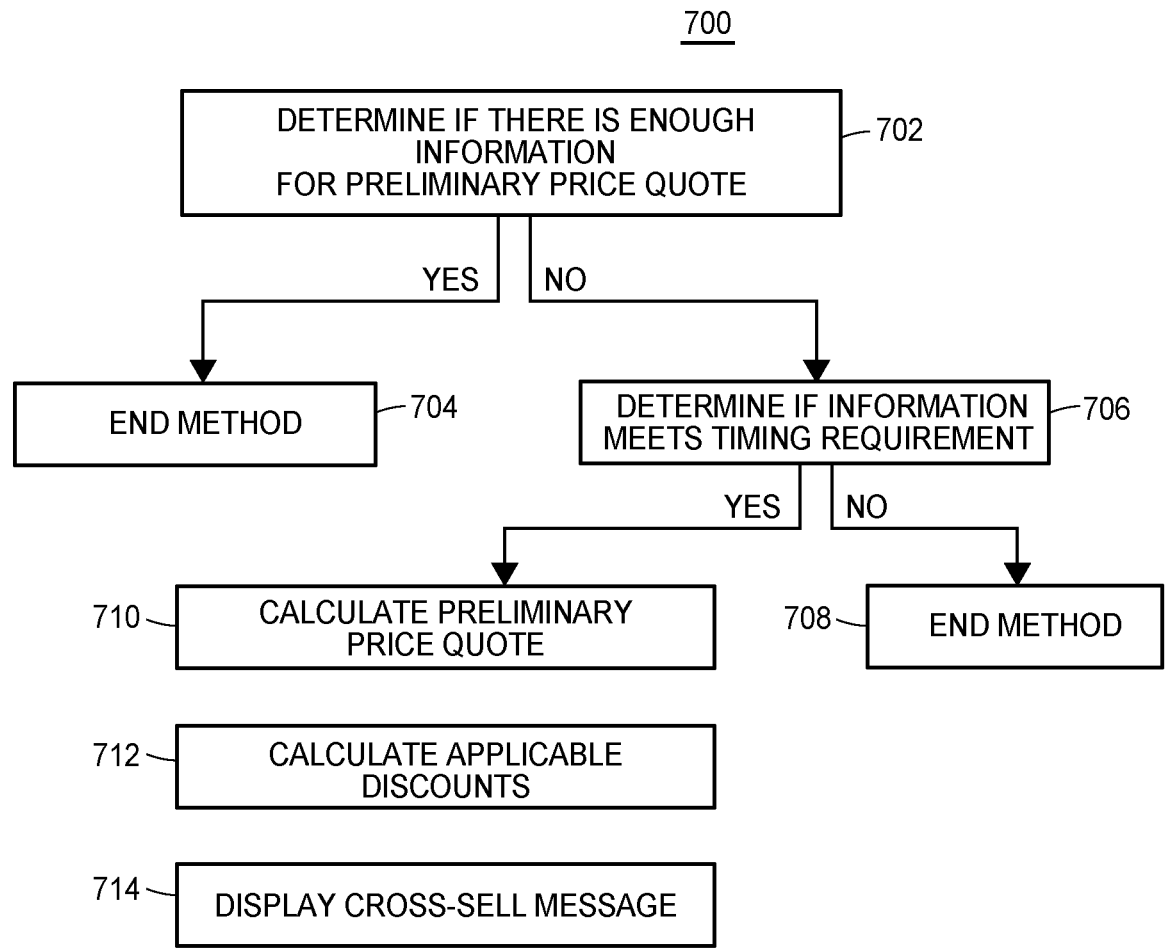
FIG. 7 is a flow chart illustrating an exemplary method for determining a preliminary price quote for a potential cross-sell product according to one embodiment of the present invention.

Turning now to FIG. 7 a flowchart of a method, routine or process 700 for determining a preliminary price quote for a potential cross-sell product is described. A data server may determine if there is enough information available to determine a price quote (block 702). For example, the data server may use available information in order to instantly calculate a preliminary price quote to be included in the cross-sell message for presentation to the customer for the one or more additional cross-sell products. If the data server determines that there is not enough information to calculate the price quote (NO branch of block 702), then the data server may end the routine (block 704). If the data server determines that there is enough information to calculate the price quote (YES branch of block 702), then the data server may check to see if the data meets a time retirement (block 706). Because the price quote may rely so heavily on certain data, if that data is out of date, the price quote could be miscalculated. For example, if the information is less than 30 days old, the data server may determine the data meets the time requirement and is current.

Alternatively, if the data was more than 90 days old, the data serve may determine that the data does not meet the time requirement. If the data does not meet the requirement, (NO branch of block 706), then the data server may end the routine (block 708). If the data server determines that the data does meet the time requirement (YES branch of block 706), the data server may use the data to calculate a preliminary price quote for the product (block 710). The data server may also calculate one or more discounts which apply to the bundle and apply the discount to the preliminary price quote (block 712). Then, the data server may generate and display a cross-sell message to the user, the cross-sell message including the preliminary price quote and/or the discount (block 714).

Figure 8:
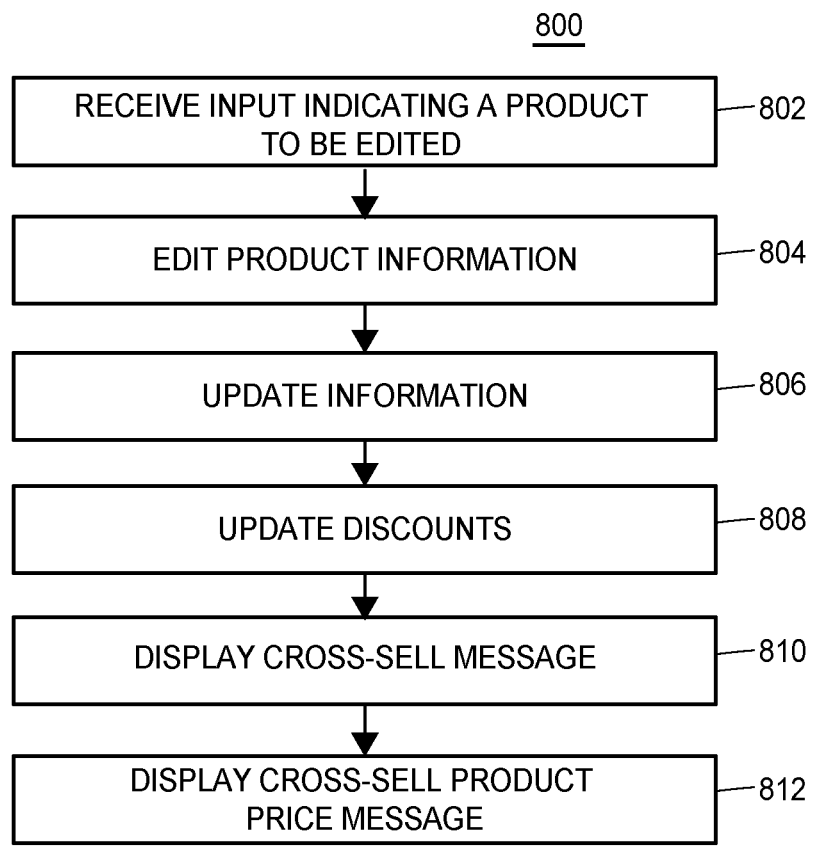
FIG. 8 is a flow chart illustrating an exemplary method for prompting a customer to complete a price quote application is described.

Referring now to FIG. 8, a flowchart of a method, routine or process 800 for presenting a cross-sell message is described in an embodiment where a user has already purchased one or more products from a company. Accordingly, the customer may wish to edit information pertaining to a first product. The edit may include removing, updating and/or adding information to the selected product/service. In response to receiving an input indicating the first product the customer wishes to edit (block 802), the customer may make the desired edits and the data server may receive an input indicating that the customer has completed editing the product/service (block 804). Once the data server has received an input indicating that the information has been updated, the data server may update the information pertaining to the first product, the information pertaining to the price quote of the first product and any additional products may (block 806). The data server may update one or more applicable discounts to the customer's product/service (block 808), and the update may include the data server adding or removing one or more discounts in response to the customer editing the information pertaining to the products/services. Furthermore, the data server may generate and display a cross-sell message containing one or more cross-sell products based on the updated information (block 810).

Additionally, using the information linked to the customer account, the data server may also display a cross-sell product price message (block 812) including, for example, one or more preliminary price quotes for the one or more products and one or more applicable discounts if the data server receives an input indicating a customer's decision to add the one or more cross-sell products to their bundle and purchase the cross-sell products.

Figure 9:
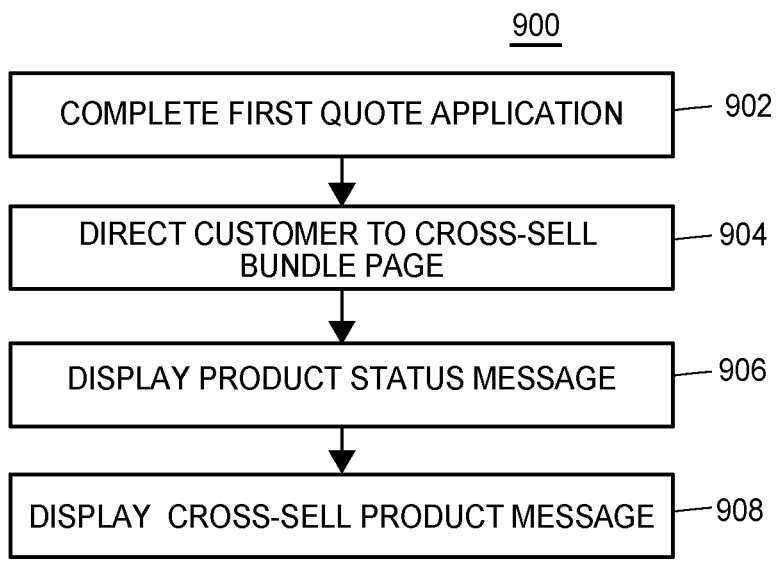
FIG. 9 is a flow chart illustrating an exemplary method for presenting a cross-sell message is described according to one embodiment of the present invention.

Referring now to FIG. 9, a flowchart of a method, routine or process 900 for presenting a cross-sell message is described. After receiving an input indicting that a customer has completed the first quote application (block 902), the data server may direct the customer to the cross-sell bundle page (block 904). The data server may also generate and display a status message relating to the first quote (block 906). For example, the status message may indicate that the quote is completed. Alternatively, if one or more of the quotes in the bundle are not completed, a message may be generated and displayed which indicates that the product price quote application must be completed before the customer is allowed to purchase the products in the bundle. The data server may also display a message promoting one or more potential cross-sell products which had been flagged by the data server earlier (block 908). The cross-sell message may indicate a preliminary price quote of the product as well as one or more discounts which may be applicable to the customer's bundle if the customer adds the cross-sell product to the bundle. The customer may then make an input indicating a decision to select an additional product to add to the bundle or may make an input indicating that they wish to pay for the products in their bundle.

Figure 10:
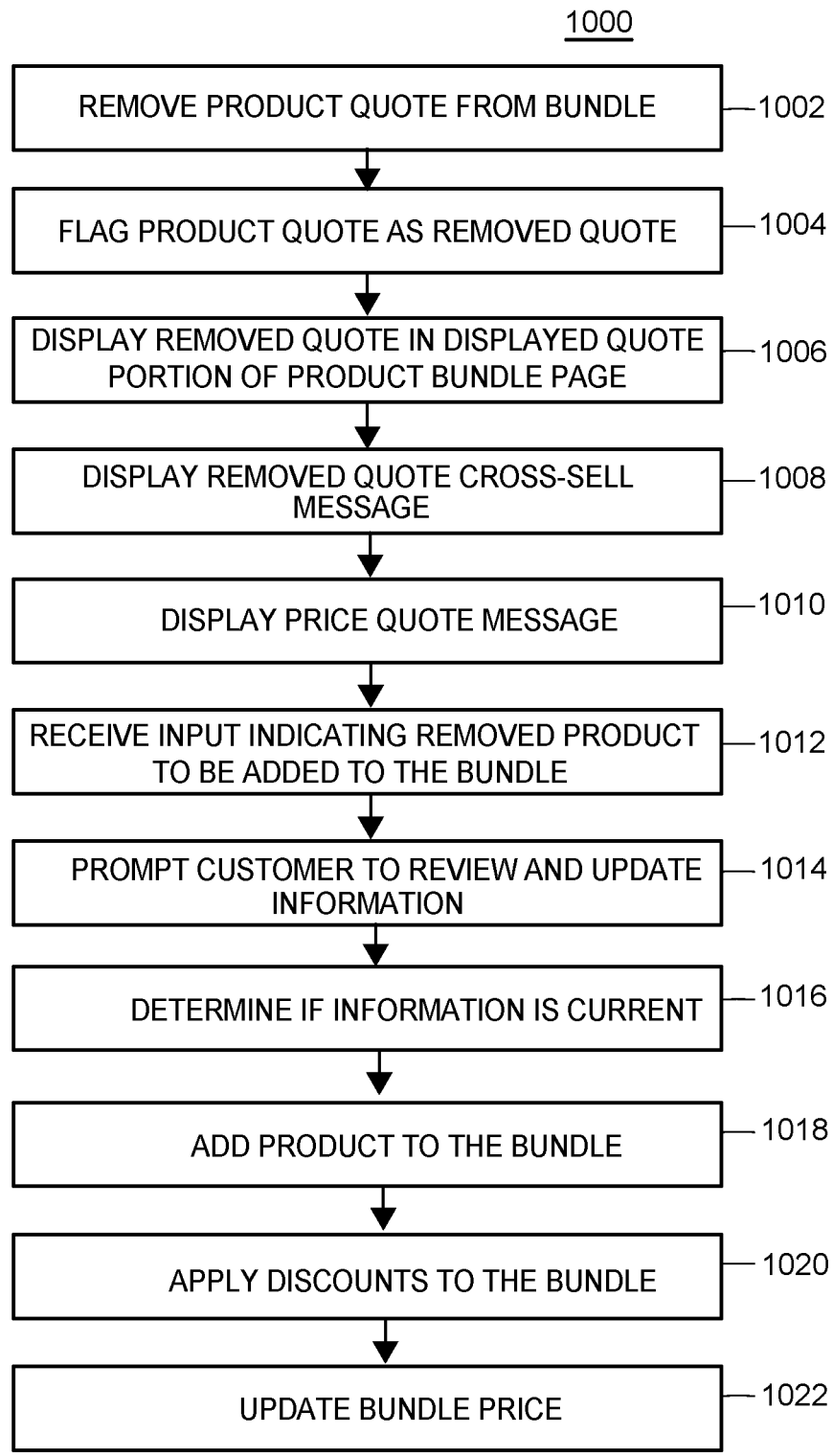
FIG. 10 is a flow chart illustrating an exemplary method for presenting a cross-sell message is described according to another embodiment of the present invention.

Referring now to FIG. 10, a flowchart of a method, routine or process 1000 for presenting a cross-sell message is described. If the customer does not wish to purchase a product after seeing the product price quote, the customer may choose to remove one or more product quotes from their bundle. If the server receives an input indicating a choice to remove a quote from the bundle (block 1002), the removed quote may be flagged by the data server as a removed quote (block 1004). The data server may display the removed quote (block 1006) on a portion of the cross-sell bundle page that displays one or more removed quotes. Accordingly, at some later time the data server may display a cross-sell message suggesting that a customer purchase one or more of the removed quotes (block 1008), and the data server may also a price message designating one or more discounts which may apply to the customer's bundle (block 1010) if the customer adds the one or more saved and/or removed quotes to their bundle. The one or more discounts may be represented by a dollar value or a percentage, in one or more currencies.

If a customer enters an input indicating the one or more removed quotes to re-add to their bundle (block 1012), the data server may generate and display a message prompting a customer to review and update the information (block 1014), in case any data has changed since the customer created the saved or removed product price quote. The data server may determine that the information is current (block 1016) and the one or more removed product quotes may be added to the bundle (block 1018). For example, if the information is less than 30 days old, the data server may determine the date is current enough. In response to putting the one or more saved or removed products in the bundle, the data server may determine that one or more discounts may be applied to the bundle (block 1020) and a total price may be updated (block 1022) by the data server to include the price of the one or more saved and/or removed product quotes and apply the one or more applicable discounts. In an alternate embodiment (not shown), the customer may remove the one or more product price quotes from the bundle and save the one or more product price quotes from the bundle and the saved quote(s) may be flagged by the data server as a saved quote. In yet another alternate embodiment not shown, the information may not be current and the data server may generate and display a message prompting a customer to edit the product information.

Figure 11:
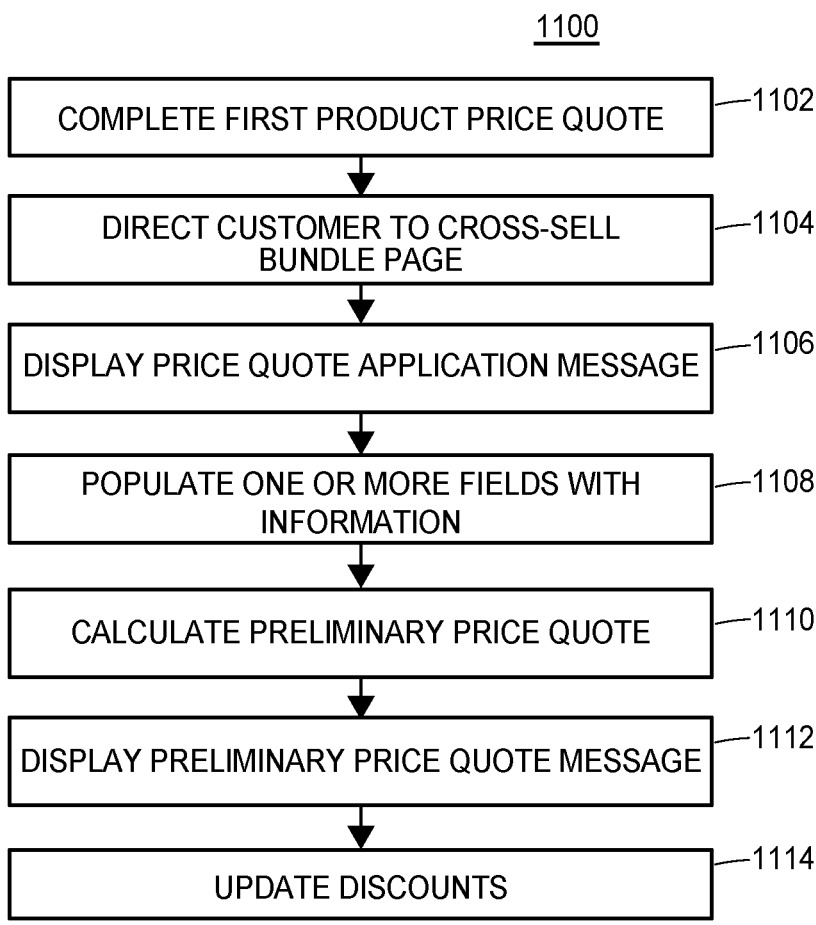
FIG. 11 is a flow chart illustrating an exemplary method for presenting a cross-sell message is described according to yet another embodiment of the present invention.

Referring now to FIG. 11, a flowchart of a method, routine or process 1100 for prompting a customer to complete a price quote application is described. In yet another embodiment, the data server may have only completed the price quote application for the first product of a plurality of products in the bundle. After receiving an input that the first price quote has been completed(block 1102), the web server may direct a customer to the cross-sell bundle page (block 1104), and the data server may generate and display a message prompting the customer to begin the price quote application for the second product (block 1106). Furthermore, the data server may begin to populate one or more fields of information pertaining to the second product with the information received from the first product (block 1108). One or more fields of information pertaining to the second product price quote application may be completed by the data server with information gathered from the one or more databases, such as a publicly available database or a private database requiring payment to access data. Based on the fields of information pertaining to the second product which have been populated, the data server may also calculate a preliminary price quote for the second product (block 1110). Accordingly, the data server may generate and display a preliminary price quote message containing the preliminary price quote (block 1112) and the data server may update one or more discounts based on the preliminary price quote for the second product (block 1114).

Figure 12:
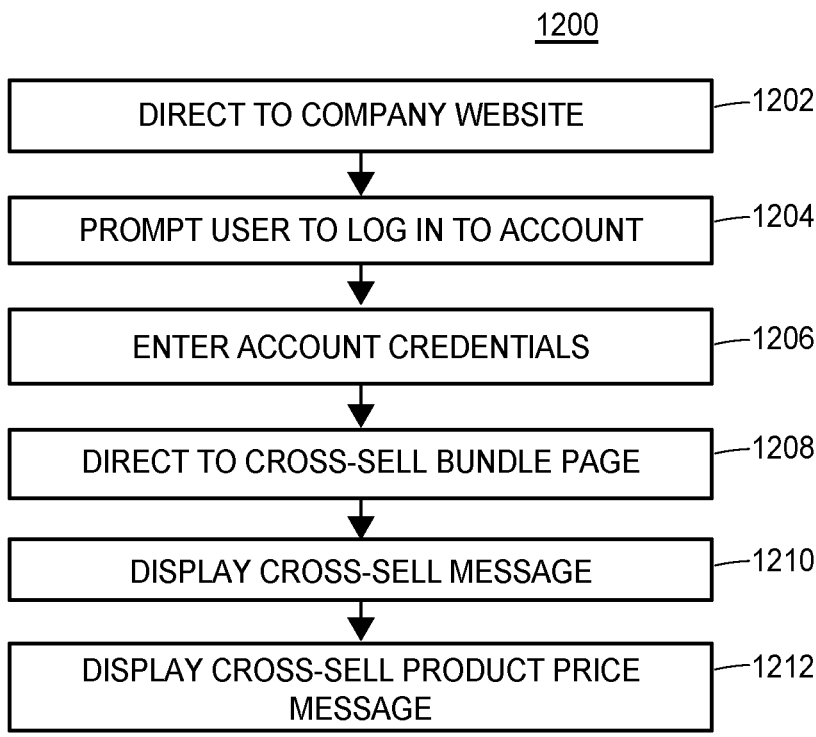
FIG. 12 is a flow chart illustrating an exemplary method for predicting and presenting of an exemplary cross-sell product; and The figures depict a preferred embodiment of the present invention for purposes of illustration only. One skilled in the art will readily recognize from the following discussion that alternative embodiments of the structures and methods illustrated herein may be employed without departing from the principles of the invention described herein.

Referring now to FIG. 12, a flowchart of a method, routine or process 1200 for presenting a cross-sell message is described in an embodiment where a customer may have a customer account affiliated with a company website. Upon being directed to the company website or dedicated application by the web server (block 1202), the data server may prompt the customer to log in to the customer account (block 1204). In response the customer may enter credentials to log into their customer account (block 1206). Once the web serve has received an input indicated that the customer has entered their credentials, the web server may direct the customer to the cross-sell bundle page (block 1208) and the data server may also display a cross-sell message containing one or more cross-sell products based on customer information linked to the customer account (block 1210). Additionally, using the information linked to the customer account, the data server may also display a cross-sell product price message (block 1212) including, for example, one or more preliminary price quotes for the one or more products and one or more applicable discounts if the customer decides to add the one or more cross-sell products to their bundle and purchase the cross-sell products.

The following additional considerations apply to the foregoing discussion. Throughout this specification, plural instances may implement functions, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The methods described in this application may include one or more functions or routines in the form of non-transitory computer-executable instructions that are stored in a tangible computer-readable storage medium and executed using a processor of a computing device (e.g., the computing device 102, the server 120, or any combination of computing devices within the system 100). The routines may be included as part of any of the modules described in relation to FIG. 1 or 2 or as part of a module that is external to the system illustrated by FIGS. 1 and 2. For example, the methods may be part of a browser application or an application running on the computing device 102 as a plug-in or other module of the browser application. Further, the methods may be employed as "software-as-a-service" to provide a computing device 102 with access to the data system 104.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain functions. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data and data structures stored as bits or binary digital signals within a machine memory (e.g., a computer memory). These algorithms or symbolic representations are examples of techniques used by those of ordinary skill in the data processing arts to convey the substance of their work to others skilled in the art. As used herein, a "function" or an "algorithm" or a "routine" is a self-consistent sequence of operations or similar processing leading to a desired result. In this context, functions, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a function, process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a computer system 100 for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for segmenting a customer base and implementing specific behaviors for each customer segment through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

To the extent that any meaning or definition of a term in this document conflicts with any meaning or definition of the same term in a document incorporated by reference, the meaning or definition assigned to that term in this document shall govern. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A method, implemented in a server, for facilitating a price quote for a cross-sell product, the method comprising:
   receiving, by one or more processors of the server, an input indicating that a first price quote application associated with a first insurance product has been completed;
   after receiving the input, directing, by the one or more processors, a customer to a cross-sell bundle web page indicating (i) a price quote for the first insurance product and (ii) a first message prompting the customer to begin a second price quote application associated with a second insurance product;
   causing, by the one or more processors and using information obtained from the customer via the first price quote application, one or more information fields of the second price quote application to be populated;
   calculating, by the one or more processors and based at least on information in the populated one or more information fields pertaining to the second insurance product, a price quote for the second insurance product; and
   causing, by the one or more processors, a the price quote for the second insurance product to be displayed to the customer.

2. The method of claim 1, further comprising:
   causing, by the one or more processors and using information received from one or more third party databases, one or more additional information fields pertaining to the second insurance product to be populated on the cross-sell web page.

3. The method of claim 1, further comprising, prior to receiving the input:
   communicating a plurality of questions to the customer via the first price quote application, wherein the plurality of questions relate to the first insurance product; and
   receiving a plurality of customer responses to the plurality of questions via the first price quote application, wherein the information obtained from the customer includes at least one of the plurality of customer responses.

4. The method of claim 1, further comprising:
   determining, by the one or more processors and before calculating the price quote for the second insurance product, whether there is enough information available to determine the price quote for the second insurance product.

5. The method of claim 1, further comprising:
   determining, by the one or more processors and before calculating the price quote for the second insurance product, whether information that can be used to determine the price quote for the second insurance product meets a time requirement.

6. The method of claim 1, further comprising:
   receiving, by the one or more processors, an input from the customer indicating a choice to remove the price quote for the second insurance product from a first portion of the cross-sell web page; and
   in response to receiving the input from the customer, moving, by the one or more processors, the price quote for the second insurance product from the first portion of the cross-sell web page to a second portion of the cross-sell web page.

7. The method of claim 6, further comprising:
   receiving, by the one or more processors, an additional input from the customer indicating a choice to add the price quote for the second insurance product back to the first portion of the cross-sell web page; and
   in response to receiving the additional input from the customer, moving, by the one or more processors, the price quote for the second insurance product from the second portion of the cross-sell web page to the first portion of the cross-sell web page.

8. A computer device for predicting a cross-sell product to be presented to a customer, the computer device comprising;

one or more processors; and one or more memories coupled to the one or more processors, wherein the one or more memories store instructions that, when executed by the one or more processors, cause the one or more processors to receive an input indicating that a first price quote application associated with a first insurance product has been completed, after receiving the input, direct the customer to a cross-sell bundle web page indicating (i) a price quote for the first insurance product and (ii) a first message prompting the customer to begin a second price quote application associated with a second insurance product, cause, using information obtained from the customer via the first price quote application, one or more information fields of the second price quote application to be populated, calculate, based at least on information in the populated one or more information fields pertaining to the second insurance product, a price quote for the second insurance product, and cause a the price quote for the second insurance product to be displayed to the customer.

9. The computer device of claim 8, wherein the instructions further cause the one or more processors to:

cause, using information received from one or more third party databases, one or more additional information fields pertaining to the second insurance product to be populated on the cross-sell web page.

10. The computer device of claim 8, wherein the instructions further cause the one or more processors to, prior to receiving the input:

communicate a plurality of questions to the customer via the first price quote application, wherein the plurality of questions relate to the first insurance product; and receive a plurality of customer responses to the plurality of questions via the first price quote application, wherein the information obtained from the customer includes at least one of the plurality of customer responses.

11. The computer device of claim 8, wherein the instructions further cause the one or more processors to:

determine, before calculating the price quote for the second insurance product, whether there is enough information available to determine the price quote for the second insurance product.

12. The computer device of claim 8, wherein the instructions further cause the one or more processors to:

determine, before calculating the price quote for the second insurance product, whether information that can be used to determine the price quote for the second insurance product meets a time requirement.

13. The computer device of claim 8, wherein the instructions further cause the one or more processors to:

receive an input from the customer indicating a choice to remove the price quote for the second insurance product from a first portion of the cross-sell web page; and in response to receiving the input from the customer, move the price quote for the second insurance product from the first portion of the cross-sell web page to a second portion of the cross-sell web page.

14. The computer device of claim 13, wherein the instructions further cause the one or more processors to:

receive an additional input from the customer indicating a choice to add the price quote for the second insurance product back to the first portion of the cross-sell web page; and in response to receiving the additional input from the customer, move the price quote for the second insurance product from the second portion of the cross-sell web page to the first portion of the cross-sell web page.

15. A non-transitory computer readable medium storing instructions that, when executed by one or more processors, cause the one or more processors to:

receive an input indicating that a first price quote application associated with a first insurance product has been completed;

after receiving the input, direct a customer to a cross-sell bundle web page indicating (i) a price quote for the first insurance product and (ii) a first message prompting the customer to begin a second price quote application associated with a second insurance product;

cause, using information obtained from the customer via the first price quote application, one or more information fields of the second price quote application to be populated;

calculate, based at least on information in the populated one or more information fields pertaining to the second insurance product, a price quote for the second insurance product; and cause a the price quote for the second insurance product to be displayed to the customer.

16. The non-transitory computer readable medium of claim 15, wherein the instructions further cause the one or more processors to:

cause, using information received from one or more third party databases, one or more additional information fields pertaining to the second insurance product to be populated on the cross-sell web page.

17. The non-transitory computer readable medium of claim 15, wherein the instructions further cause the one or more processors to, prior to receiving the input:

communicate a plurality of questions to the customer via the first price quote application, wherein the plurality of questions relate to the first insurance product; and receive a plurality of customer responses to the plurality of questions via the first price quote application, wherein the information obtained from the customer includes at least one of the plurality of customer responses.

18. The non-transitory computer readable medium of claim 15, wherein the instructions further cause the one or more processors to:

determine, before calculating the price quote for the second insurance product, whether information that can be used to determine the price quote for the second insurance product meets a time requirement.

19. The non-transitory computer readable medium of claim 15, wherein the instructions further cause the one or more processors to:

receive an input from the customer indicating a choice to remove the price quote for the second insurance product from a first portion of the cross-sell web page; and in response to receiving the input from the customer, move the price quote for the second insurance product from the first portion of the cross-sell web page to a second portion of the cross-sell web page.

20. The non-transitory computer readable medium of claim 15, wherein the instructions further cause the one or more processors to:

receive an additional input from the customer indicating a choice to add the price quote for the second insurance product back to the first portion of the cross-sell web page; and in response to receiving the additional input from the customer, move the price quote for the second insurance product from the second portion of the cross-sell web page to the first portion of the cross-sell web page.

* * * * *